(12) United States Patent
Greer (10) Patent No.: US 7,114,054 B2
(45) Date of Patent: Sep. 26, 2006

(54) SYSTEMS AND METHODS FOR INCREASING TRANSACTION ENTRIES IN A HARDWARE QUEUE

(75) Inventor: Christopher Alan Greer, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/434,655

(22) Filed: May 9, 2003

(65) Prior Publication Data
US 2004/0225765 A1 Nov. 11, 2004

(51) Int. Cl.
*G06F 12/10* (2006.01)
(52) U.S. Cl. .................. 711/207; 711/173; 711/128
(58) Field of Classification Search ............. 711/205, 711/207, 170, 173, 128
See application file for complete search history.

(56) References Cited

U.S. PATENT DOCUMENTS

| | | | |
|---|---|---|---|
| 4,615,001 A | | 9/1986 | Hudgins, Jr. |
| 5,317,720 A | | 5/1994 | Stamm et al. |
| 6,119,204 A | * | 9/2000 | Chang et al. ............... 711/141 |
| 6,138,225 A | * | 10/2000 | Upton et al. ................ 711/207 |
| 6,157,986 A | * | 12/2000 | Witt ............................ 711/118 |
| 6,253,287 B1 | * | 6/2001 | Green ......................... 711/125 |
| 6,345,352 B1 | | 2/2002 | James et al. |
| 6,353,871 B1 | * | 3/2002 | Benveniste et al. ............ 711/3 |
| 6,493,776 B1 | | 12/2002 | Courtright et al. |
| 6,735,673 B1 | * | 5/2004 | Kever ......................... 711/118 |
| 2002/0019903 A1 | | 2/2002 | Lin |
| 2003/0018855 A1 | * | 1/2003 | McWilliams et al. ........ 711/128 |
| 2003/0079073 A1 | | 4/2003 | Richard et al. |
| 2003/0188110 A1 | * | 10/2003 | Abali et al. .................. 711/154 |
| 2004/0225765 A1 | * | 11/2004 | Greer ............................ 710/52 |

FOREIGN PATENT DOCUMENTS

| | | |
|---|---|---|
| EP | 0201252 | 5/1985 |
| EP | 0583965 | 8/1992 |
| EP | 1089500 | 4/2001 |
| EP | 1128612 | 8/2001 |

OTHER PUBLICATIONS

Affidavit of Richard W. Adkisson, Feb. 17, 2005, 4 pages.

* cited by examiner

*Primary Examiner*—Brian R. Peugh (57) ABSTRACT

Systems and methods for increasing transaction entries in a hardware queue of the type having a fixed number of storage elements. One of a plurality of transaction entries in one of the storage elements is accessed through at least one pointer having one or more first bits that identify the one element and one or more second bits that identify the one transaction entry within the one element. Information that is part of the one transaction entry is modified when the one transaction entry is accessed from the one storage element.

18 Claims, 6 Drawing Sheets

SYSTEMS AND METHODS FOR INCREASING TRANSACTION ENTRIES IN A HARDWARE QUEUE

RELATED APPLICATIONS

This application is related to the following commonly owned and co-filed U.S. Patent applications, filed May 9, 2003 and incorporated herein by reference: SYSTEMS AND METHODS FOR GENERATING TRANSACTION IDENTIFIERS, now U.S. Pat. No. 6,996,654; SYSTEMS AND METHODS FOR DELETING TRANSACTIONS FROM MULTIPLE FAST DATA STREAMS; SYSTEMS AND METHODS TO INSERT BROADCAST TRANSACTIONS INTO A FAST DATA STREAM OF TRANSACTIONS; and SYSTEMS AND METHODS FOR COMBINING A SLOW DATA STREAM AND A FAST DATA STREAM INTO A SINGLE FAST DATA STREAM

BACKGROUND

A high speed server has multiple processors connected to a bus. These processors incorporate agents that interface with the bus to provide bus communications between the processors and, for example, input/output ("I/O") devices. One of the agents, a "central" agent, handles hardware configuration, initialization, special transactions, and error detection. Another agent, a "symmetric" agent, arbitrates for the bus using a symmetric round-robin arbitration.

Each processor may access common data on the bus using a virtual addressing technique; "common" data is data that is shared between more than one processor. In the processors, virtual addresses are translated into absolute addresses using a hardware structure called a Translation Lookaside Buffer ("TLB"). An entry in the TLB translates a virtual page number into a corresponding physical page number, where the physical page number addresses a processor's local random access memory ("RAM"); the RAM contains a copy of the data corresponding to the virtual address. The entry remains in the TLB until the data copy is no longer required for access or is purged by another processor. As each processor has a copy of the common data in local RAM, it is necessary to purge all TLB entries referencing the data when, for example, the data is changed by another processor. A processor changing the data may execute a purge global translation cache instruction to remove all TLB entries in all TLB queues.

By way of example, the execution of a purge global translation cache instruction in a Hewlett-Packard PA-RISC processor generates a "purge TC transaction," known in the art, on the bus. When the purge TC transaction is issued, all bus agents assert a TLB Purge Not Done signal ("TND#") until the purge is completed. The TND# signal remains asserted until all agents have de-asserted the TND# signal and the purge TC transaction completes. Only one outstanding purge TC transaction is issued at a time, though multiple purge TC transactions can be issued. To support multiple purge TC transactions, a purge-TLB queue is implemented internally to each agent to store purge TC transaction information.

In the prior art, the central agent supports a maximum of sixty-four concurrently outstanding purge TC transactions. Thus, for example, up to sixty-four PA-RISC processors can issue purge TC transactions concurrently. However, it is desirable to increase the number of concurrent purge TC transactions to, for example, one hundred and twenty-eight.

One prior art solution increases the depth of the purge-TLB queue; however, this solution requires a hardware modification, which is costly.

SUMMARY OF THE INVENTION

One method increases transaction entries in a hardware queue of the type having a fixed number of storage elements, including: accessing one of a plurality of transaction entries in one of the storage elements through at least one pointer having one or more first bits that identify the one element and one or more second bits that identify the one transaction entry within the one element; and modifying information that is part of the one transaction entry when the one transaction entry is accessed from the one storage element.

One method increases transaction entries in a hardware queue of the type having a fixed number of storage elements, including: storing at least two transaction entries in at least one of the storage elements; reading one of the transaction entries in one of the storage elements through one or more pointers having one or more first bits that identify the one element and one or more second bits that identify the one transaction entry within the one storage element; and regenerating information as part of the one transaction entry when the one transaction entry is read from the one storage element.

One method increases transaction entries in a hardware queue of the type having a fixed number of storage elements, including: writing a first transaction entry into one of the storage elements through one or more first pointers having one or more first bits that identify the one element and one or more second bits that identify the first transaction entry within the one element; and writing a second transaction entry into the one storage element through one or more second pointers having one or more third bits that identify the one element and one or more fourth bits that identify the second transaction entry within the one element.

One system increases transaction entries in a hardware queue. A plurality of cells communicate on a first bus. Each of the cells has a plurality of processors communicating with a chipset on a second bus. The chipset has a central agent with a first hardware queue. Each of the processors has a symmetric agent with a second hardware queue. The first and second hardware queues have a first plurality of storage elements for storing a plurality of transaction entries. The central agent accesses one of the transaction entries in one of the storage elements without disturbing any other transaction entries in the one storage element.

One system increases transaction entries in a hardware queue of the type having a fixed number of storage elements, including: means for accessing one of a plurality of transaction entries in one of the storage elements through at least one pointer having least significant bits that identify the one element and a next most significant bit that identifies the one transaction entry within the one element; and means for modifying information that is part of the one transaction entry when the one transaction entry is accessed from the one storage element.

DETAILED DESCRIPTION OF THE FIGURES

Figure 1:
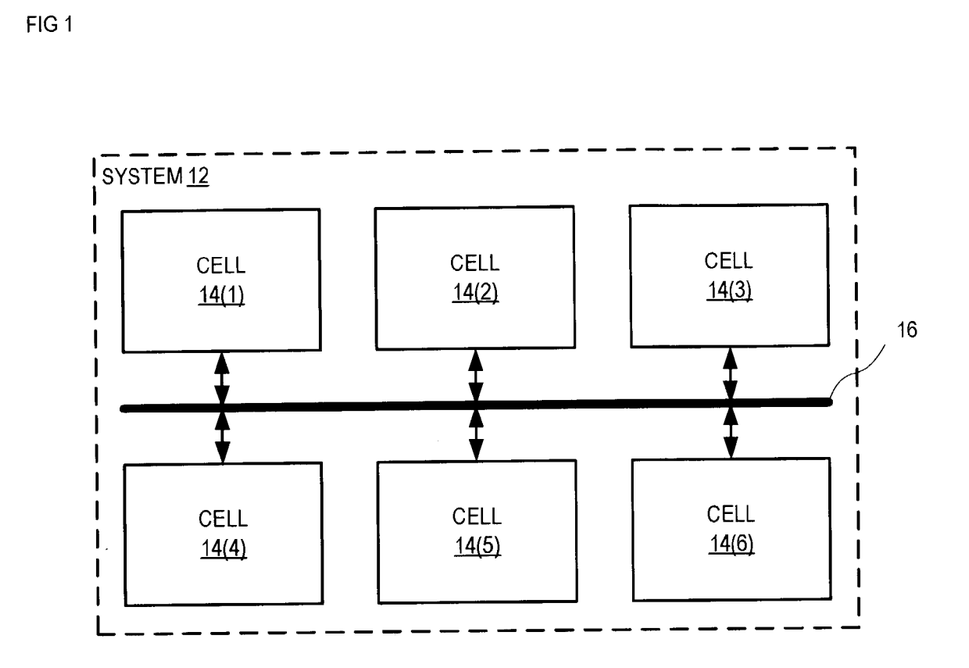
FIG. 1 is a block diagram showing one system for increasing transaction entries in a hardware queue.

FIG. 1 is a block diagram showing one system 12 that increases capacity of a hardware queue, for example to store purge TC transaction information in a high speed server. System 12 is shown with six cells 14(1)–14(6) inter-connected by a bus (a "crossbar link") 16, though system 12 may have additional cells 14 as a matter of design choice. As described in more detail below, each cell 14 provides processing and memory resources for system 12.

Figure 2:
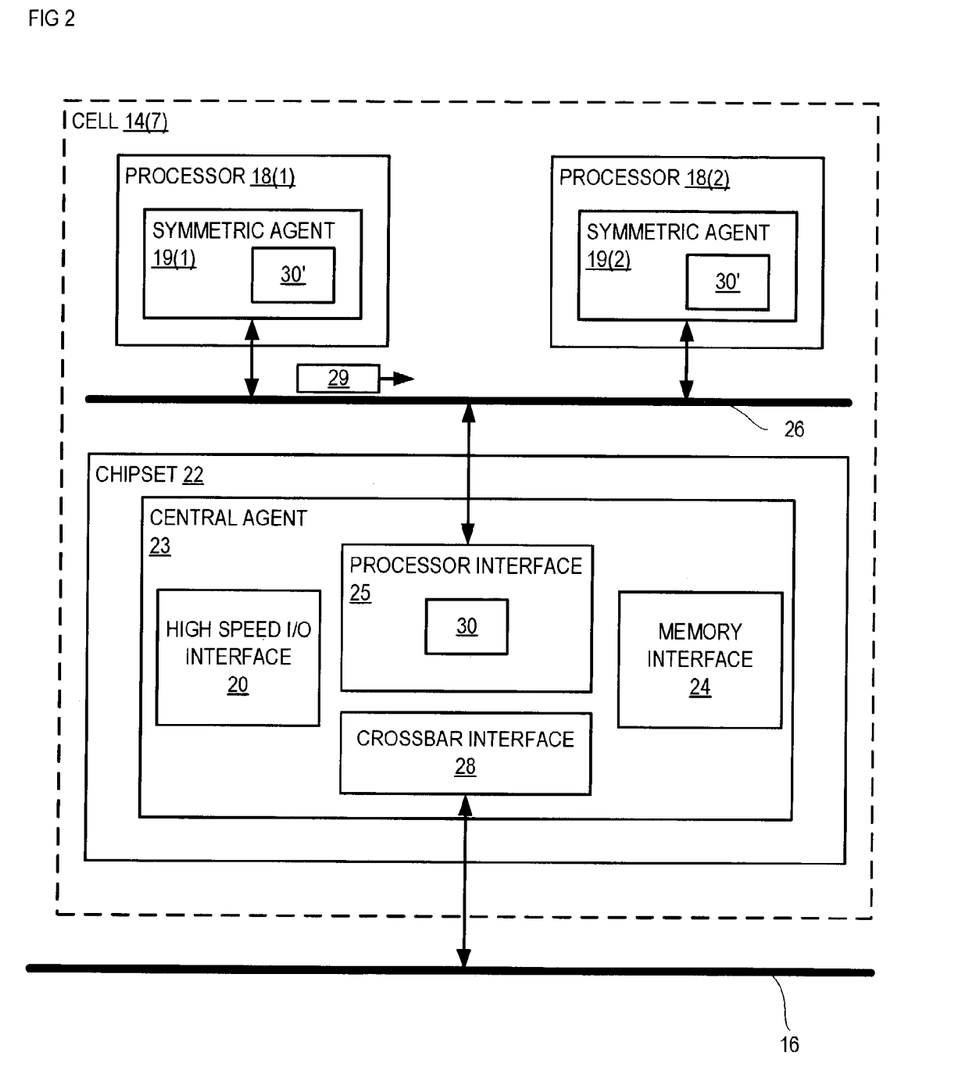
FIG. 2 is a block diagram illustrating exemplary detail of one cell in the system of FIG. 1.

FIG. 2 illustrates exemplary detail of one cell 14(7). Cell 14(7) may for example be used as a cell 14, FIG. 1. Cell 14(7) has two processors 18(1) and 18(2) interconnected by a bus 26 and supported by a core electronics complex, known as a chipset 22. Chipset 22 has a central agent 23 that includes a processor interface 25, connecting to bus 26, and a high speed crossbar interface 28, connecting to crossbar link 16, to facilitate cell-to-cell communication. Central agent 23 is further shown with a high speed input/output ("I/O") interface 20 and a memory interface 24 that interface to high speed peripheral devices and memory devices, respectively. Though cell 14(7) is shown with two processors 18(1), 18(2), one bus 26, one high speed I/O interface 20, and one memory interface 24, each cell 14 may support additional busses 26, processors 18, I/O interfaces 20 and memory interfaces 24, as a matter of design choice.

Central agent 23 interfaces with bus 26 to facilitate communication between chipset 22 and processors 18. Processor 18(1) has a symmetric agent 19(1) that interfaces with bus 26 to facilitate communication between processor 18(1) and chipset 22. Processor 18(2) has a symmetric agent 19(2) that interfaces with bus 26 to facilitate communication between processor 18(2) and chipset 22.

In one illustrative embodiment of system 12 and cell 14, communications from processor 18 to chipset 22 includes a purge TC transaction 29. Information about purge TC transaction 29 is for example stored in a hardware queue 30' of symmetric agent 19. Such information is, for example, shown as a transaction information 31, FIG. 3.

Each symmetric agent 19 thus has a hardware queue 30', as shown. Processor interface 25 of central agent 23 also has a hardware queue 30 that stores transaction information 31. In one example, both hardware queue 30 and hardware queue 30' store up to one hundred and twenty-eight transaction entries. Hardware queues 30 and 30' are, for example, purge TLB queues within system 12.

Figure 3:
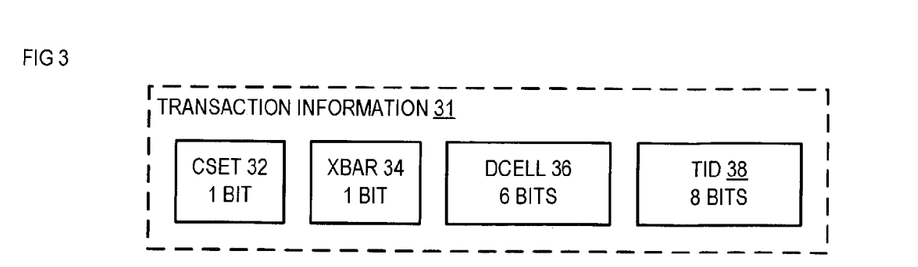
FIG. 3 illustrates information relating to a purge TLB transaction.

In an illustrative example of operation, processor 18(1) executes a "purge global translation cache" instruction, resulting in the generation of purge TC transaction 29 on bus 26. As noted above, transaction information 31 associated with purge TC transaction 29 is shown in FIG. 3. A one-bit cset field 32 defines whether purge TC transaction 29 originated in chipset 22 or elsewhere. A one-bit xbar field 34 defines whether purge TC transaction 29 arrived via crossbar link 16 or was generated within cell 14. A six-bit dcell field 36 identifies a destination cell 14 for purge TC transaction 29. An eight-bit tid field 38 contains a transaction number that identifies purge TC transaction 29 within system 12. In this illustrative example, transaction information 31 has sixteen bits of information.

Figure 4:
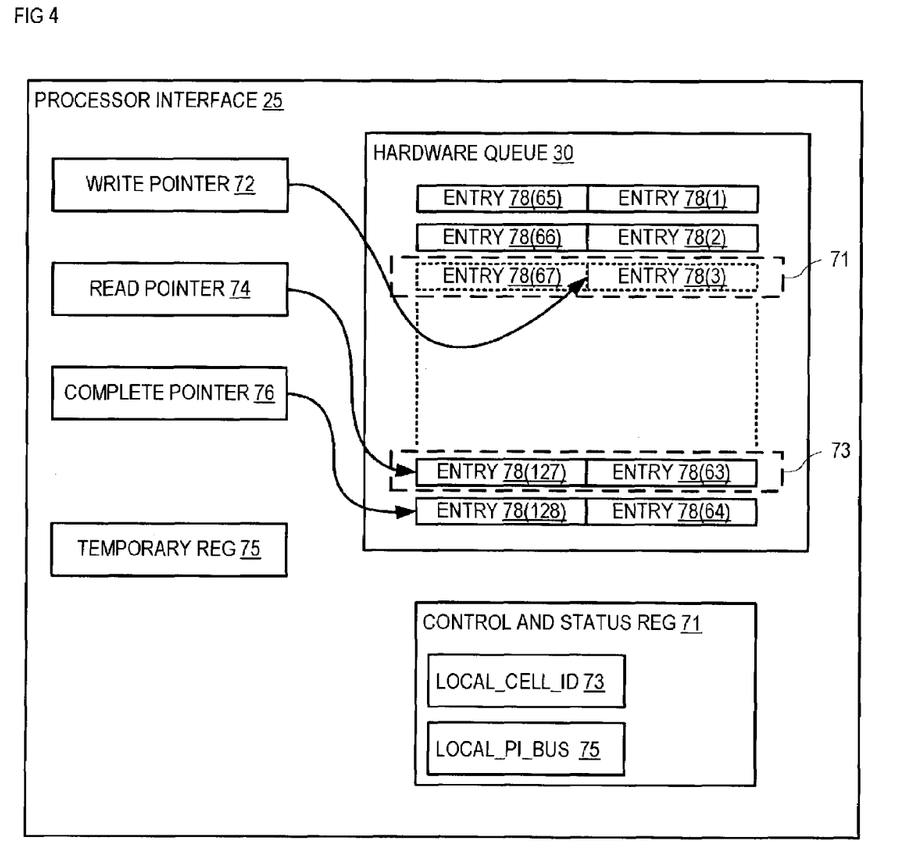
FIG. 4 illustrates one processor interface including a dual entry hardware queue with one hundred twenty-eight entries and three access pointers.

In one embodiment, hardware queues 30 and 30' each have sixty-four, twenty-bit elements. FIG. 4 is a block diagram illustrating one embodiment of processor interface 25 that utilizes hardware queue 30 with the sixty-four twenty-bit elements, used to store one hundred and twenty-eight purge TLB transaction entries 78. Accordingly, processor interface 25 stores two entries 78 in each element of hardware queue 30.

Read and write access to hardware queue 30, FIG. 4, simultaneously accesses two entries 78. For example, elements 71 and 73 each represent one twenty-bit addressable element of hardware queue 30. Two entries 78 are stored in each addressable location: element 71 contains entries 78(3) and 78(67), and element 73 contains entries 78(63) and 78(127). A plurality of pointers 72, 74 and 76 are shown within processor interface 25; these pointers operate to control access to entries 78 within hardware queue 30. Pointers 72, 74 and 76 each consist of seven bits, and can therefore reference one hundred and twenty eight individual entries (78(1) through 78(128)) of hardware queue 30.

Figure 6:
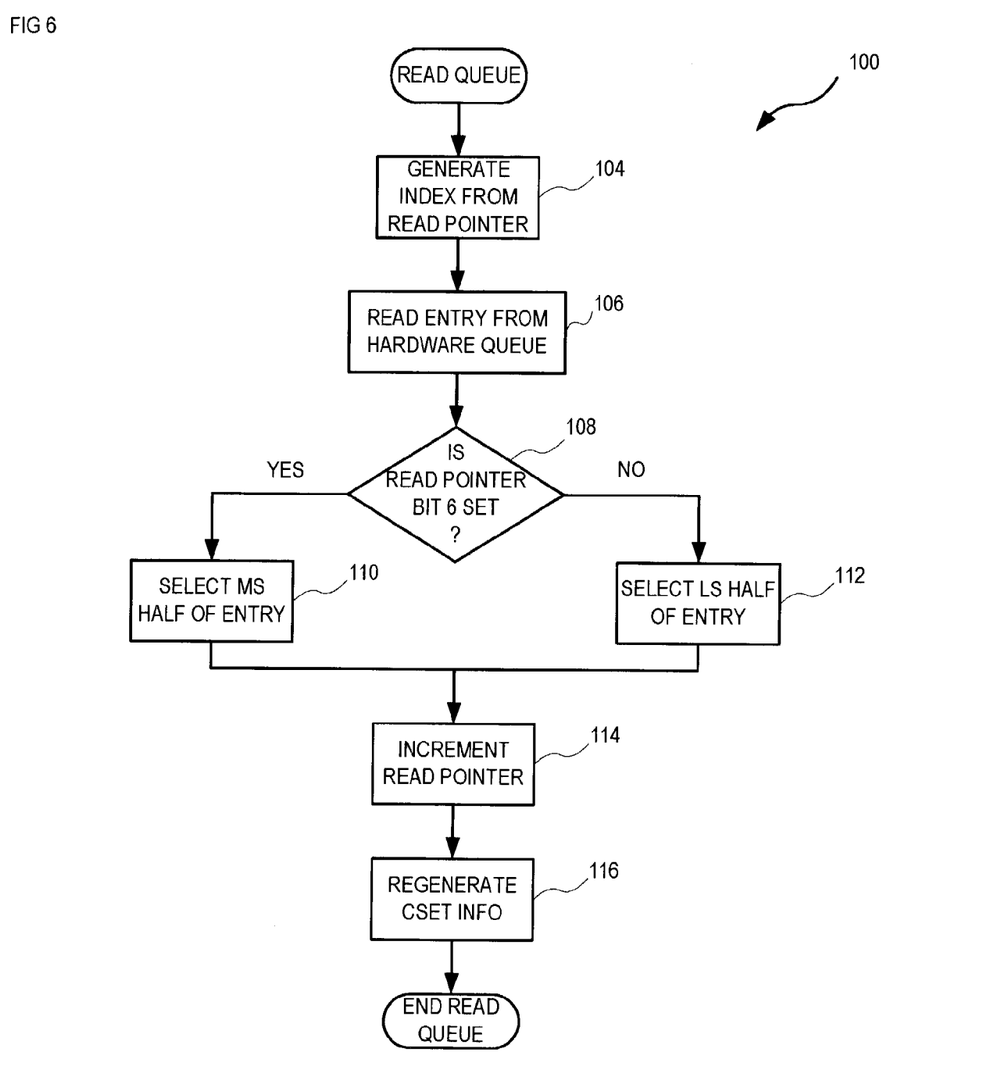
FIG. 6 is a flowchart illustrating one process for reading an entry from the dual entry hardware queue of FIG. 4.
Figure 7:
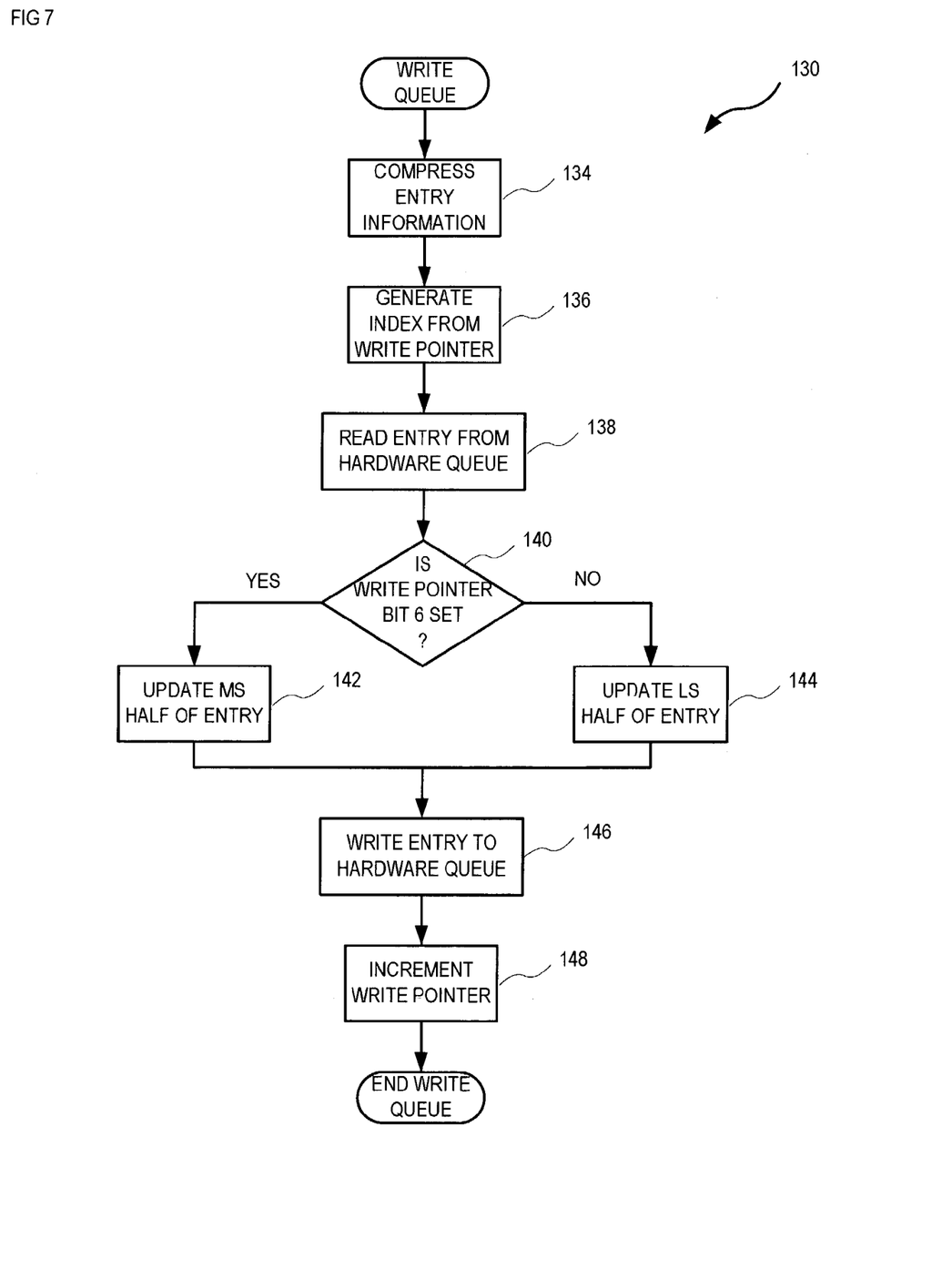
FIG. 7 is a flowchart illustrating one process for writing an entry to the dual entry hardware queue of FIG. 4.

To write entry 78(3) to hardware queue 30, element 71 is first read into a temporary register 75. Temporary register 75 contains a copy of entry 78(3) (being updated, in the example) and a copy of entry 78(67) (remaining unchanged, in the example). Temporary register 75 is updated with a new value for entry 78(3), without changing its copy of entry 78(67); the entries of temporary register 75 are then written to element 71. FIG. 6 and FIG. 7 describe exemplary processes for reading and writing entries 78 of hardware queue 30.

In one embodiment, hardware queue 30 operates as a cyclic buffer of one hundred and twenty-eight entries 78; pointers 72, 74 and 76 thus loop to entry 78(1) after incrementing past entry 78(128). In one example, the least significant six bits (bits 0–5) of pointers 72, 74 and 76 index each twenty-bit element of hardware queue 30; the most significant bit (bit 6) identifying which half of the physical element contains the indexed entry 78.

More particularly, write pointer 72 references a free entry (e.g., entry 78(3)) in hardware queue 30 into which new transaction information 31 is next inserted. Read pointer 74 references an entry 78(127) to be next removed from hardware queue 30. When removing an entry 78 from hardware queue 30, central agent 23 issues, for example, a purge_TLB packet transaction or a purge_TLB_done packet transaction onto bus 26, depending on which agent originated purge TC transaction 29. In processor interface 25, complete pointer 76 references a next packet to be tracked on bus 26.

Figure 5:
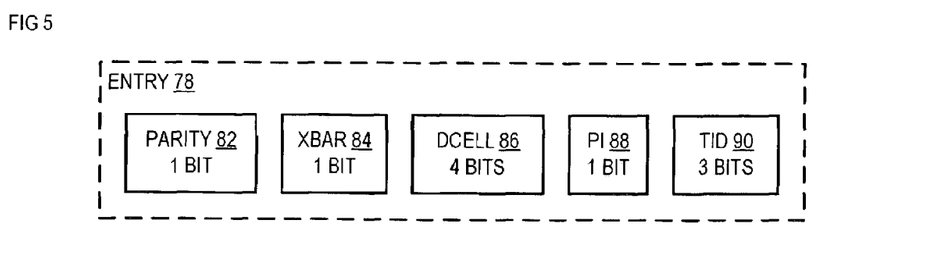
FIG. 5 illustrates one entry of the dual entry hardware queue of FIG. 4.

In one example, each purge TLB entry 78 is limited to ten bits; transaction information 31 is thus optimized to fit within 10-bit entry 78. FIG. 5 is a block diagram illustrating an exemplary data structure of entry 78, defining data fields used to store transaction information 31, FIG. 3. For example, tid 38 of transaction information 31, FIG. 3, includes information defining which processor interface 25 of cell 14 generated purge TC transaction 29, since each cell 14 may contain a plurality of processor interfaces 25. If there are a maximum of eight processors 18 within cell 14, tid 90, FIG. 5, can use three bits to store the tid information. One bit of tid 38 defines which processor on bus 26 of cell 14 generated purge TC transaction 29. Other tid information is stored in a pi bit 88 within entry 78.

In one embodiment, system 12 has sixteen cells 14. In the embodiment, dcell 86, FIG. 3, uses four bits to identify one of the sixteen possible cells 14 within system 12. An xbar field 84 of one bit indicates if purge TC transaction 29 originated in a remote cell, arriving via crossbar link 16, or if purge transaction 29 originated locally. Xbar 34 of transaction information 31 is available to xbar 84. A parity bit, par 82, is used to detect single bit errors within entry 78. Cset 32 bit, FIG. 3, is not stored in entry 78 as it can be regenerated from entry 78 and from known local information.

To determine if chipset 22 originated purge TLB transaction 29 associated with entry 78, Equation 1 may be used:

$$\text{chipset\_originated\_ptlb} = !((\text{local\_cell\_id} == \text{dest\_cell\_id}) \,\&\, (\text{local\_pi\_bus} == \text{src\_pi\_bus})); \quad \text{Equation 1:}$$

In Equation 1, a local_cell_id 73 is located in a control and status register ("CSR") 71 within processor interface 25, FIG. 4. Local_cell_id 73 contains a number identifying cell 14 associated with processor interface 25. In an example, read pointer 74 references entry 78(127) of hardware queue 30, and identifier dest_cell_id refers to dcell 86 of entry 78(127). Identifier local_pi_bus 75, also located in CSR 71, identifies processor interface 25 when processor interface 25 receives purge TC transaction 29. In the example, identifier src_pi_bus refers to pi 88 of entry 78(127).

In one embodiment, transaction information 31 is compressed and stored in entry 78 such that all information of transaction information 31 may be reconstructed, or generated, when required.

Using the example shown in FIG. 4, FIG. 6 is a flowchart illustrating one process 100, performed by processor interface 25, for reading an entry (e.g., entry 78(127)) referenced by read pointer 74 from hardware queue 30. Step 104 generates an index from the lower six bits of read pointer 74 into hardware queue 30. The index references an element of hardware queue 30 containing two entries 78 (e.g., entries 78(127) and 78(63) located in element 73 of hardware queue 30).

Step 106 reads element 73 from hardware queue 30.

Step 108 is a decision. If bit six of read pointer 74 is one, process 100 continues with step 110; otherwise process 100 continues with step 112.

Step 110 selects the most significant half (e.g., entry 78(127)) of element 73 read in step 106. Process 100 continues with step 114.

Step 112 selects the least significant half (e.g., entry 78(63)) of element 73 read in step 106. Process 100 continues with step 114.

Step 114 increments read pointer 74. If read pointer 74 is greater than 127, read pointer 74 is reset to zero. For example, in step 114, a seven bit pointer may automatically increment to zero from 127.

Step 116 regenerates information not within entry 78(127). For example, Equation 1 is evaluated in step 116 to determine if chipset 22 originated purge TC transaction 29, thereby regenerating cset 32 of transaction information 31. Field sizes may be increased to match field sizes used within transaction packets, as desired.

Using the example of FIG. 4, FIG. 7 shows a flowchart illustrating one process 130, performed by processor interface 25, for writing purge TLB information 31 to entry 78(3) of hardware queue 30. Step 134 compresses transaction information 31 into a format defined by dual entry purge TLB entry 78 (e.g., entry 78(3)). Information that can be generated from other information, or that is not required in further processing, is not written to the entry. For example, cset 32 may be regenerated using Equation 1, and is therefore not written to entry 78(3). Similarly, the most significant two bits of dcell 36 are not required as a maximum number of cells 14 used in system 12 may be sixteen, requiring only four bits of information. Parity may also be generated in step 134 as odd or even, to set par 82.

Step 136 generates an index, from the lower six bits of write pointer 72, for hardware queue 30. In the above example, the generated index references element 71 of hardware queue 30 that contains entries 78(67) and 78(3).

Step 138 reads element 71 from hardware queue 30 into temporary register 75.

Step 140 is a decision. If bit six of write pointer is one, process 130 continues with step 142; otherwise, process 130 continues with step 144.

Step 142 updates the most significant half of temporary register 75 with the compressed information from step 134. Process 130 continues with step 146.

Step 144 updates the least significant half of temporary register 75 with the compressed information generated in step 134. Process 130 continues with step 146.

Step 146 writes temporary register 75 to element 71, thereby updating entry 78(3) without corrupting entry 78(67).

Step 148 increments write pointer 72. If write pointer 72 is greater than 127, write pointer 72 is reset to zero. If write pointer 72 is seven bits, pointer 72 may automatically increment from 127 to zero.

Figure 8:
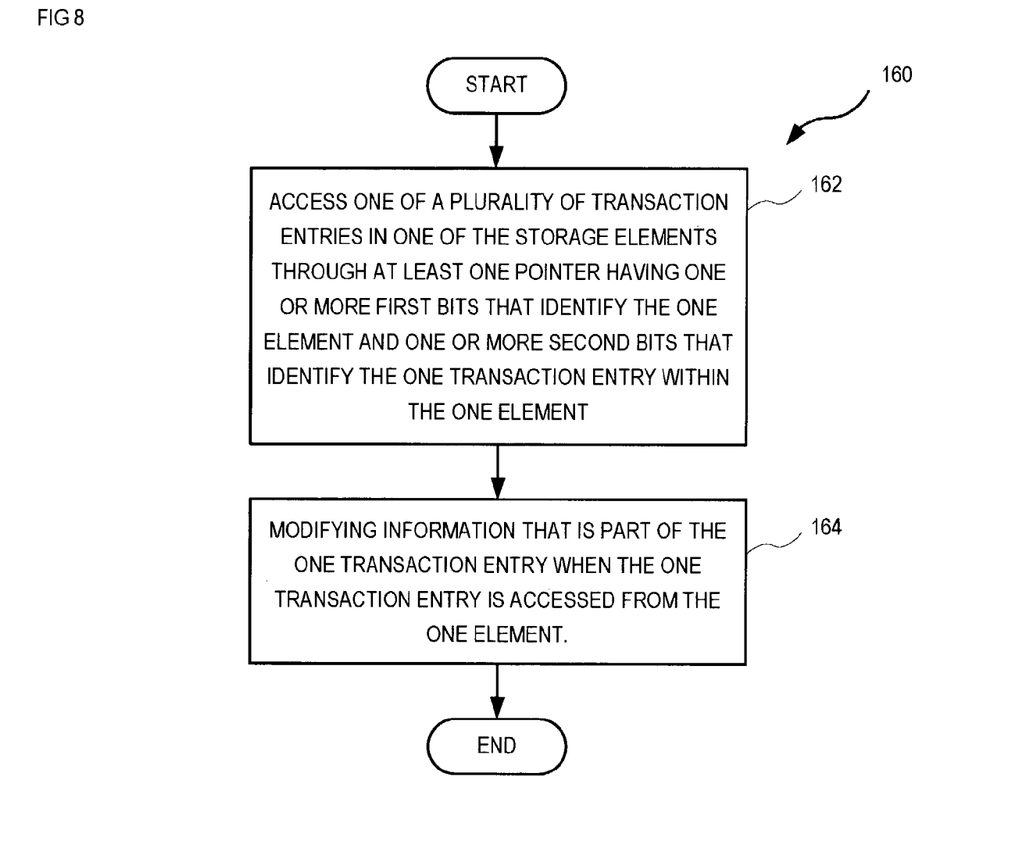
FIG. 8 illustrates one method for increasing transaction entries in a hardware queue.

FIG. 8 is a flowchart 160 illustrating one method for increasing transaction entries in a hardware queue of the type having a fixed integer number of storage elements. In step 162, one of a plurality of transaction entries in one of the storage elements is accessed through at least one pointer having one or more first bits that identify the one element and one or more second bits that identify the one transaction entry within the one element. In step 164, information that is part of the one transaction entry is modified when the one transaction entry is accessed from the one storage element.

Upon reading and fully appreciating the disclosure, one skilled in the art appreciates that the systems and methods described above are not limited to increasing capacity of purge TLB queues, and may be applied to certain other hardware queues. The systems and methods described above, for example, may double the number of entries 78 stored within hardware queue 30 of a high speed server without requiring hardware modification.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for increasing transaction entries in a hardware queue of the a type having a fixed number of storage elements, comprising:

writing one of a plurality of transaction entries in one of the storage elements through at least one pointer having one or more first bits that identify the one element and one or more second bits that identify the one transaction entry within the one element; and modifying information that is part of the one transaction entry when the one transaction entry is written to the one storage element, wherein the step of modifying comprises compressing information associated with the one transaction by deleting information available through local information of a central agent.

2. The method of claim 1, further comprising reading the one transaction entry and regenerating information associated with the one transaction entry.

3. The method of claim 2, the step of regenerating comprising utilizing the local information.

4. The method of claim 1, further comprising the step of storing a temporary copy of the one transaction entry in a temporary register.

5. The method of claim 1, further comprising the step of storing at least two transaction entries within the one storage element.

6. A method for increasing transaction entries in a hardware queue of a type having a fixed number of storage elements, comprising:

compressing information associated with each of the transaction entries by deleting information available through local information of a central agent:

storing at least two transaction entries in at least one of the storage elements through one or more pointers having one or more first bits that identify the storage element and one or more second bits that identify the two transaction entries within the storage element;

reading one of the transaction entries in one of the storage elements through one or more pointers having one or more first bits that identify the one storage element and one or more second bits that identify the one transaction entry within the one storage element; and     regenerating information as part of the one transaction entry by utilizing the local information when the one transaction entry is read from the one storage element.

7. The method of claim 6, wherein the fixed number is sixty four.

8. A method for increasing transaction entries in a hardware queue of a type having a fixed number of storage elements, comprising:

writing a first transaction entry into one of the storage elements through one or more first pointers having one or more first bits that identify the one storage element and one or more second bits that identify the first transaction entry within the one storage element, wherein the information of the first transaction is compressed to remove information that may be regenerated from a cell associated with the hardware queue; and     writing a second transaction entry into the one storage element through one or more second pointers having one or more third bits that identify the one storage element and one or more fourth bits that identify the second transaction entry within the one storage element, wherein the information of the second transaction is compressed to remove information that may be regenerated from the cell.

9. The method of claim 8, wherein the fixed number is sixty-four.

10. The method of claim 8, further comprising the step of storing a temporary copy of each of the first and second transaction entries in a temporary register.

11. The method of claim 8, wherein the first pointers and second pointers are the same.

12. The method of claim 8, wherein the steps of writing comprise reading the one storage element into a temporary register, updating the temporary register with the transaction entry and writing the temporary register to the one storage element.

13. A system for increasing transaction entries in a hardware queue, comprising:

a plurality of cells communicating on a first bus, each of the cells having a plurality of processors communicating with a chipset on a second bus, the chipset having a central agent with a first hardware queue, each of the processors having a symmetric agent with a second hardware queue, the first and second hardware queues having a first plurality of storage elements for storing a plurality of transaction entries, the central agent accessing one of the transaction entries in one of the storage elements without disturbing any other transaction entries in the one storage element.

14. The system of claim 13, further comprising means for compressing information of the one transaction entry when writing the one transaction entry to the one element.

15. The system of claim 13, further comprising means for augmenting information of the one transaction entry by regenerating information available in one of the cells containing the one storage element.

16. The system of claim 13, wherein the storage elements comprises sixty-four elements, the plurality of transaction entries comprising at least one hundred twenty eight transaction entries.

17. A system for increasing transaction entries in a hardware queue of a type having a fixed number of storage elements, comprising:

means for storing one of a plurality of transaction entries in one of the storage elements through at least one pointer having least significant bits that identify the one element and a next most significant bit that identifies the one transaction entry within the one element; and     means for modifying information that is part of the one transaction entry when the one transaction entry is accessed from the one storage element, wherein the means for modifying comprises means for compressing information of the one transaction entry to remove information that may be regenerated from a cell associated with the hardware queue.

18. The system of claim 17, further comprising means for reading the one transaction entry, and means for regenerating information associated with the one transaction.

* * * * *

UNITED STATES PATENT AND TRADEMARK OFFICE
CERTIFICATE OF CORRECTION

| | | |
|---|---|---|
| PATENT NO. | : 7,114,054 B2 | Page 1 of 1 |
| APPLICATION NO. | : 10/434655 | |
| DATED | : September 26, 2006 | |
| INVENTOR(S) | : Christopher Alan Greer | |

It is certified that error appears in the above-identified patent and that said Letters Patent is hereby corrected as shown below:

In column 6, line 58, in Claim 1, delete "the a" and insert -- a --, therefor.

In column 7, line 20, in Claim 6, delete "agent:" and insert -- agent; --, therefor.

Signed and Sealed this

Twenty-third Day of December, 2008

JON W. DUDAS
*Director of the United States Patent and Trademark Office*